United States Patent [19]

Spirig

[11] Patent Number: 5,421,504

[45] Date of Patent: Jun. 6, 1995

[54] SOLDERING DEVICE AND SOLDER DISPENSER

[76] Inventor: Ernest Spirig, Hohlweg 1, P.O. Box 1140, CH-8640 Rapperswil, Switzerland

[21] Appl. No.: 986,720

[22] Filed: Dec. 8, 1992

[30] Foreign Application Priority Data

Dec. 13, 1991 [GB] United Kingdom ............... 9126530

[51] Int. Cl.6 .................................................. B23K 1/00
[52] U.S. Cl. ......................................... 228/41; 228/902; 228/45; 228/52; 226/158
[58] Field of Search ............... 228/41, 244, 52, 903, 228/45; 226/158

[56] References Cited

U.S. PATENT DOCUMENTS

| | | | |
|---|---|---|---|
| 1,701,894 | 2/1929 | McCue | 228/52 |
| 2,672,838 | 3/1954 | Heidenreich | 228/41 |
| 3,531,038 | 9/1970 | Dezzani | 228/52 |
| 3,592,378 | 7/1971 | Petraglia . | |
| 4,511,785 | 4/1985 | Arter | 228/45 |
| 5,031,817 | 7/1991 | Chen | 228/52 |

FOREIGN PATENT DOCUMENTS

| | | | |
|---|---|---|---|
| 870504 | 3/1942 | France . | |
| 2604934 | 4/1988 | France | 228/52 |
| 3913143 | 10/1990 | Germany . | |
| 0092269 | 7/1980 | Japan | 228/41 |
| 0174273 | 10/1984 | Japan | 228/52 |
| 0005869 | 1/1988 | Japan | 228/45 |
| 0487769 | 6/1992 | Japan | 228/52 |
| 661887 | 8/1987 | Switzerland . | |

Primary Examiner—P. Austin Bradley
Assistant Examiner—James Miner
Attorney, Agent, or Firm—Watson, Cole, Grindle & Watson

[57] ABSTRACT

A soldering device includes a tube (1) for delivering a source of heating energy such as gas which is slidingly mounted in a chamber (52) such as a piston cylinder so that only the tube needs to be moved in order to move the heat source up and down with respect to a workpiece. Likewise, in a solder dispenser, the solder is supplied through a rigid tube (33) which may be slidingly mounted in a cylinder (52). The two may be used together in a combined soldering device/dispenser.

15 Claims, 4 Drawing Sheets

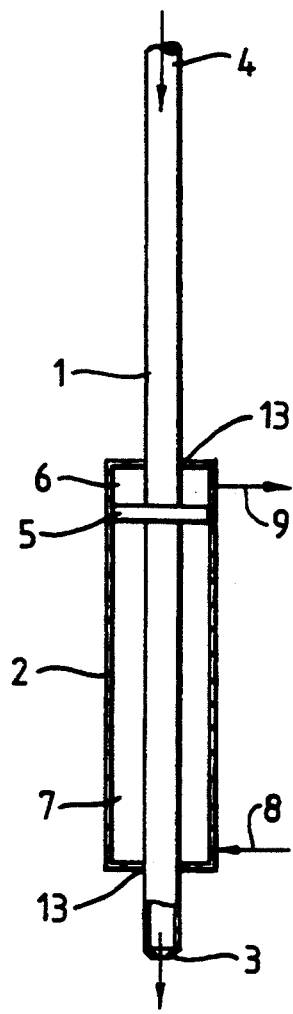
Fig. 1.0
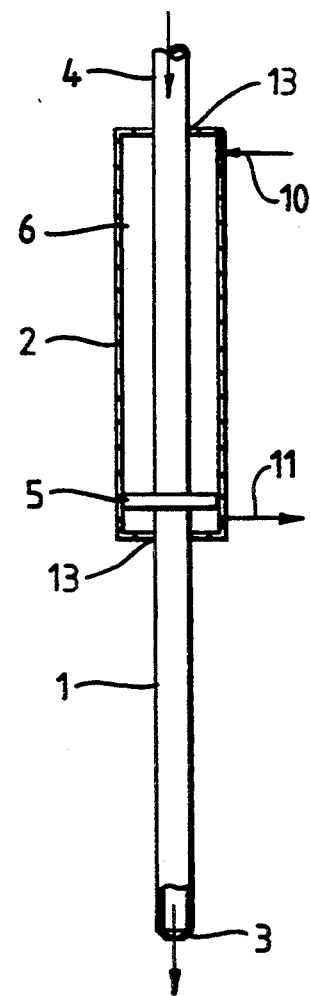
Fig. 1.1

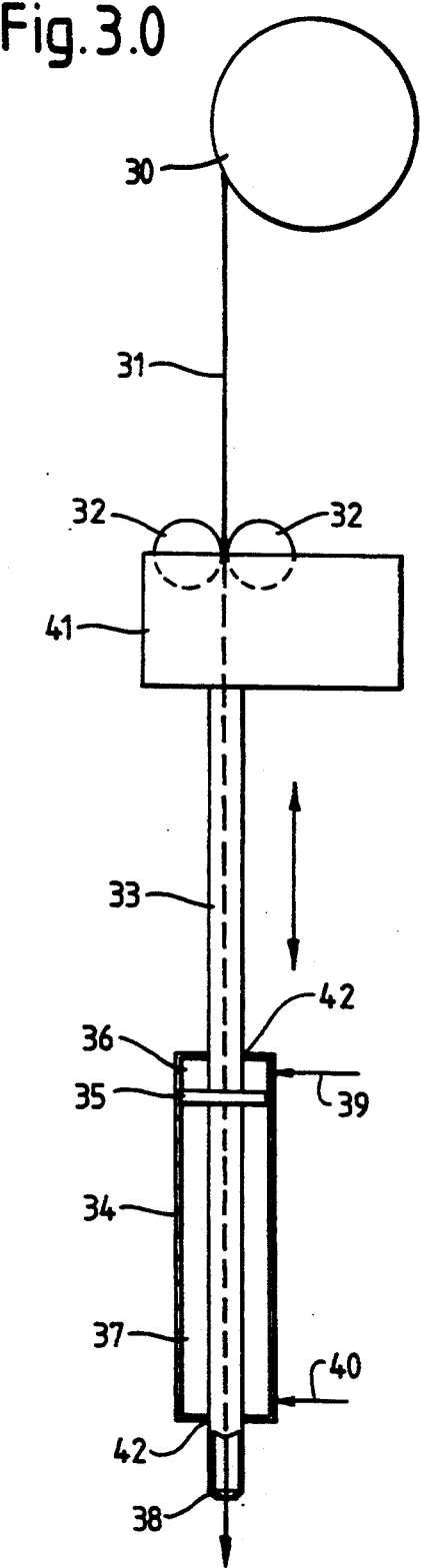
Fig. 3.0
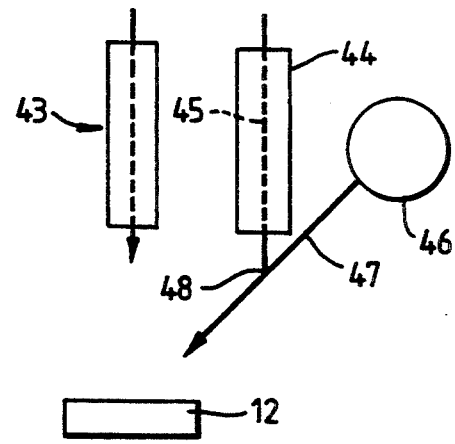
Fig. 3.1

SOLDERING DEVICE AND SOLDER DISPENSER

BACKGROUND OF THE INVENTION

The present invention relates to a soldering device and a solder dispenser, and more particularly to a soldering device and solder dispenser for use in a partially or fully automated soldering apparatus.

Soldering devices generally comprise a source of heat which can be used to melt a strip or length of solder material by the application of the heat to the solder material in close proximity to a workpiece to be soldered. Fully or partially automated soldering apparatus is available in many different forms. Such apparatus has hitherto required a very complicated structure, such as that shown in DE-A-3913143, which is limited in application, or is heavy and expensive, or is not of an industrial strength suitable for use in industrial production. For example, it is known to provide an assembly comprising a heat supply device mechanically fixed or joined to a solder wire dispenser, whereby the entire assembly is moved up and down towards or away from the workpiece. The assembly may be moved up and down by a mechanical gear arrangement or by a pneumatic or an electrical motor drive, and the relatively large mass of the entire assembly must be moved up or down as required. Such an assembly requires considerable space in which to operate, so that two or more of these assemblies would not be able to work together simultaneously on a small workpiece.

Alternatively, it is known to provide separate transport systems to move the heat supply device and the solder wire dispenser independently with respect to the workpiece. Such an arrangement is often very delicate and does not have the required industrial strength for many applications. Furthermore, known devices work on the principle whereby the transport systems move the entire heat supply device or the entire solder wire dispenser relative to the workpiece.

With the advance of microcircuit technology, there is a growing demand for soldering devices which can operate satisfactorily on very closely spaced electronic components and therefore it has become increasingly important for a soldering device to have a small operating volume.

SUMMARY OF THE INVENTION

According to one aspect of the present invention there is provided a soldering device comprising a chamber to be supported in use with respect to a work bed and a hollow tube which extends through the chamber for delivering a source of heating energy therethrough to one end thereof, the hollow tube being slidable with respect to the chamber to move the end of the tube relative to the work bed.

Thus, in the soldering device of the present invention, only the relatively narrow cylinder transporting the source of heating energy moves with respect to the remainder of the device, thus greatly reducing the required operating volume.

The soldering device may additionally or alternatively comprise a solder dispenser comprising a rigid hollow tube to be supported in use with respect to a work bed for guiding solder wire passing therethrough towards the work bed and means for moving the tube towards and away from the work bed.

The solder dispenser according to the invention not only has the advantages of reduced operating volume as compared to earlier known solder dispensers, but it also enables precise positioning of the solder and hence accurate application. In prior art solder dispensers the solder is either supplied via an open guide arrangement or a flexible tube, neither of which are as precise as the dispenser of the present invention. Furthermore, the tube used in the present invention serves to thermally protect the solder itself and enable more precise heating and application of the solder. This effect may be improved by providing a nozzle at the end of the tube from which the solder exits.

The solder dispenser may be oriented to lie at an angle to the first hollow tube, or alternatively, the end of the second tube may be angled to the remainder of the second tube and to the first hollow tube.

A soldering device according to the invention may include a tube guiding the solder wire and a tube for delivering the source of heating energy, slidingly supported in the same chamber and, optionally, linked together to move as a unit.

It will be appreciated that the combination in this way of the soldering device and the solder dispenser according to this invention results in great savings in operational volume, and also cost and complexity.

Preferably, the heating energy is supplied by means of a gas flame, the gas being fed through the first hollow tube to provide a torch tip at the end of the tube. Alternatively, other sources of heat such as an electric soldering iron tip or a laser beam from a glass fibre bundle or light conductor may be used. The heating energy supplies the heat needed to melt the solder.

The present invention is hereafter primarily described with the heating energy being supplied by a gas flame, but the same principle will apply to any other suitable form of heating energy such as a laser, where light energy is fed through the first hollow tube filled with a light-conductive fibre bundle to release the energy at the end of the tube to melt the solder, or an electric soldering iron, where the electrical energy is fed through the first hollow tube by an electric conductor and the heat energy is then released by the heater resistance in or at the end of the tube, so that the flame at the end of the movable first hollow tube could at any time be replaced by another heat releasing source.

Since precision flame sources (either mixed by precision mechanical dosing means from combustible gases and oxygen or air, or made from a hydrogen-oxygen mixture created by electrolysis of water) became available, efforts have been made to use such precision flames as heat sources for semi- or fully automated (mechanical) soft soldering or silver soldering or brazing devices in which the required filler material (solder alloy) is preferably delivered to the soldering area in a wire form and the device attempts to duplicate the manual soldering process in a mechanical apparatus comprising a guide to deliver the flame and the solder wire to the workpiece without manual interference.

Such devices have been used for the soldering of heavy mass pins to printed circuit boards (e.g. as found in automotive electronics), or of cables to connector pins, and so on. One advantage of the microflame soldering technique is its speed. Furthermore, if the sequences of heating and feeding the solder wire are properly executed, "cold solder joints" can be almost completely avoided.

A manual flame soldering procedure requires that in a first step a flame is applied to the workpiece to heat the workpiece up to soldering temperatures (the melting point of the solder alloy used). In a second step, the solder wire is applied to the workpiece to melt off a certain amount of solder, which then spreads over the heated workpiece to form the required solder joint after the workpiece has cooled.

Semi- or fully automated flame soldering duplicates the sequences of the manual operation described above by means of suitable mechanical apparatus. Such mechanical apparatus relies on the fact that such precision flames normally have a very directional pinpointed (elongated) heat radiating shape. There is very little heat radiation at the sides of the flame, and thus the flame can be guided in the same way as a pencil-like tool without much disturbing heat sensitive parts outside its flame shape.

A flame which might cause a steel wire of 0.5 mm diameter to glow at a distance of 50 mm from the flame tip might be approached with a finger from the side to almost a few millimeters from the visible flame shape without feeling much heat. However, care has to be taken during transfer of the flame from its rest or "home" position towards the soldering target, to ensure that its directional heat shape does not pass over heat sensitive parts, or that it passes over them with a high speed, so that it does not induce much heat energy in them.

Normally, these precision flames are kept burning permanently, in order to avoid gas pressure fluctuations and the resulting heat intensity fluctuations which could create variations in the soldering target temperatures. If kept burning permanently, such precision flames normally present a heat source with a relatively stable heat energy flow. Such a stable heat energy flow means that the temperature of a given solder target can be modulated by the time of exposure to the flame. Time increments are usually measured in steps of 1/10 of a second.

In order to achieve successful flame soldering, the following points should be observed. Firstly, the flame should always be directed towards the most massive (heat consuming) object of the parts to be soft soldered. Secondly, the solder wire feed operation should only be released when the temperature of the heated part(s) reaches the melting temperature of solder. Finally, the flame should usually be retracted before the solder wire is fed to the object. This ensures that the solder wire is made molten by the heat stored in the object and not by direct flame heat radiation. This sequence avoids 100% cold solder joints. The flame heating and wire dispensing operations may have some overlap time to compensate for the heat loss of small sized parts due to heat absorbed from the solder wire itself.

In prior art examples where the flame and the solder wire dispensing tube are combined in one mechanically fixed assembly which can be moved up and down to the workpiece by either a mechanical gear or a pneumatic or an electric motor drive, the up and down travel distance must be long enough to avoid flame interaction with sensitive components.

BRIEF DESCRIPTION OF THE DRAWINGS

A number of embodiments of the present invention will now be described by way of example with reference to the accompanying drawings, in which:

FIG. 1.0 is a schematic representation of a flame source in accordance with the present invention, the flame source being retracted to its rest position;

FIG. 1.1 shows the frame source of FIG. 1.0, but in its extended, use position;

FIG. 3.0 is a schematic representation of a form of solder wire dispenser according to the invention;

FIG. 3.1 is a schematic representation of yet another form of solder wire dispenser.

DETAILED DESCRIPTION OF THE PREFERRED EMBODIMENTS

Figure 2:
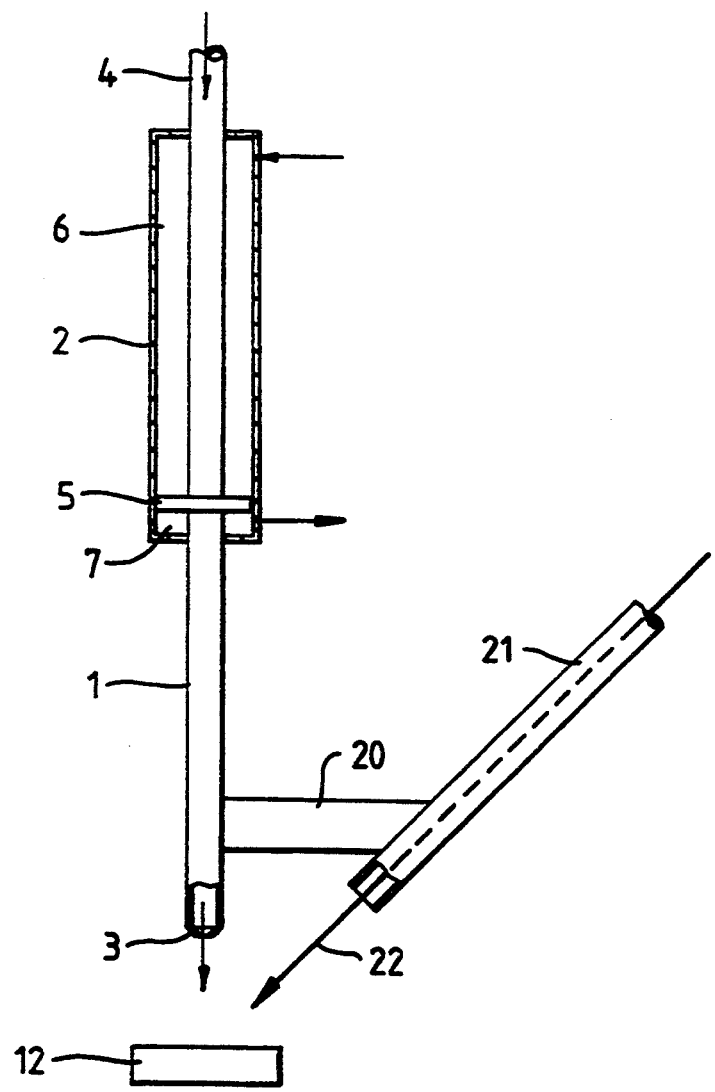
FIG. 2 is a schematic representation of one embodiment of a combined flame source and solder wire dispenser.

Referring first to FIGS. 1.0 and 1.1, a hollow tube 1 is mounted in a cylinder 2 and extends beyond the cylinder at either end. The hollow tube is provided with a flame nozzle 3 at one end of the tube and the other end 4 of the tube is adapted to be fitted to a gas supply hose (not shown). The tube 1 provides a hollow shaft which is mounted to slide up and down through the cylinder 2. In the drawings, a piston 5 is fitted to the shaft which divides the cylinder into two chambers 6 and 7, and ports are formed in the cylinder towards or at either end of the cylinder. In use, the cylinder is clamped in position. In FIG. 1.0, the shaft is retracted to its rest position, and fluid may be supplied to chamber 7 through one port as indicated by arrow 8, and removed from chamber 6 through the other port as indicated by arrow 9, to hold the shaft or tube 1 in its rest position. If fluid is then supplied to chamber 6 as indicated by arrow 10 in FIG. 1.1 and removed from chamber 7 as indicated by arrow 11, the piston 5 will move downwardly in the cylinder, sliding the shaft to its extended use position close to a workpiece 12 on a work bed (not shown). Accordingly, the Figures show a pneumatically or hydraulically actuated sliding flame nozzle, but the shaft may alternatively be driven by an electric drive solenoid or any other suitable means.

The hollow shaft or tube 1 allows gas to be supplied to the flame nozzle, and the exterior of the shaft acts as a guide as the shaft slides through apertures 13 in either end of the cylinder 2. If the nozzle is fluid actuated, the apertures 13 should be provided with sealing bearing surfaces (not shown) on which the shaft slides. Such a hollow shaft may comprise a standard item of pneumatic equipment, one end of which requires adaptation to accept and hold the flame nozzle 3. The flame nozzle may, for example, be formed from a hypodermic needle. In order to fit the flame nozzle to the tube 1, a cone and a mechanical locking mechanism (e.g. a set screw or a luer-locking mechanism such as is found in hypodermic needles) may be used.

The gas supply end 4 of the tube preferably has a smooth, rounded end to protect the gas hose from mechanical damage caused by rapid up and down movements of the tube.

The travel of the tube and nozzle between the rest position (FIG. 1.0) and the extended use position (FIG. 1.1) can easily be made large enough to avoid any problem of heat from the flame reaching heat sensitive parts of the workpiece 12. Actuation of the up and down movement of the tube may preferably be controlled by electronic means such as timers and a solenoid in the case of a pneumatically driven tube. Position sensing of the flame nozzle 3 may be achieved by position sensors of any known type, mounted on the cylinder for example to sense the position of the tube relative to the cylinder.

The flame source of FIG. 1.0 and 1.1 may be used for any kind of flame heat application. For example, it may be used to apply flame heat to plastic surfaces before printing to make the surface more receptive to the printing ink. In this application, the source may be used with a multiple orifice nozzle to produce a line of small flames, or even with a plurality of such multiple orifice nozzles. Alternatively, the flame source of FIGS. 1.0 and 1.1 may be used to apply flame heat to solder areas on which a solder alloy preform or solder alloy mixture (paste) has already been deposited, such that the flame heat melts the preform or paste to form the solder joint. Another possible application is where heat is to be applied to solder areas of a workpiece to heat those areas, and solder wire is then brought into contact with those areas to melt and form a solder joint. The solder wire may be dispensed by any suitable means independent of the flame nozzle and may for example use a solder dispenser as shown in FIG. 3.0 or 3.1 to be described hereafter.

It is envisaged that, in the arrangement shown in FIG. 2, the flame source of FIGS. 1.0 and 1.1 may be attached to a solder wire dispenser. A bracket or link 20 is formed between the hollow tube 1 and a solder wire dispenser in the form of a hollow rigid tube or stylus 21, such that the stylus is supported at an angle to the hollow tube and solder wire 22 is supplied to the workpiece 12 at a point close to or coincident with the point heated by the flame from nozzle 3. The solder wire 22 may be supplied from a continuous reel and fed through the stylus to the workpiece. Thus, as the flame nozzle and tube moves up and down, the solder dispenser moves up and down with it to feed the solder to the correct location on the workpiece. In order to prevent rotation of the tube in the cylinder which would result in the possibly undesirable rotation of the solder wire dispenser, the cylinder 2 and piston 5 may be formed with an oval cross-section or any other suitable cross-section to prevent rotation of the tube.

An alternative solder wire dispenser according to the invention is shown in FIG. 3.0 which comprises a solder wire roll 30 from which solder wire 31 passes through drive rollers 32 and into a hollow shaft 33. The hollow shaft is supported to slide through a cylinder 34, and a piston 35 fixed to the shaft divides the cylinder into two chambers 36 and 37. A guide nozzle 38 on the end of the shaft 33 provides a solder wire output. Fluid entering chamber 36 in the direction of arrow 39 pushes the piston and the shaft down towards a workpiece (not shown) while fluid entering chamber 37 in the direction of arrow 40 pushes the piston and the shaft up to the rest position. The solder wire roll 30 may either be mounted on a fixed stand remote from the dispenser or may be mounted on the hollow shaft 33. The drive rollers 32 are supported on the hollow shaft by fixing means 41.

The shaft is slidably guided for movement through the cylinder by means of an aperture 42 in each end of the cylinder, and the shaft itself acts as a guide for the wire which is fed by the drive rollers through the shaft to guide nozzle 38. The shaft as shown in FIG. 3.0 is pneumatically or hydraulically actuated, but may alternatively be actuated by a solenoid having a plunger and/or a linear electric motor, or by an other suitable means.

The solder wire dispenser of FIG. 3.0 may be used in conjunction with the flame source of FIGS. 1.0 and 1.1, or with any other suitable heat source such as a laser heater or electric soldering heater.

FIG. 3.1 represents a variation on the solder wire dispenser for use with a soldering device according to the invention. In FIG. 3.1 a flame source such as that shown in FIGS. 1.0 and 1.1 is represented by device 43. A cylinder 44 similar or identical to that used for the flame source provides a support for a shaft 45, but shaft 45 is not hollow as previously described. A standard solder wire dispenser may then be used comprising a solder wire roll 46 and a solder wire guide 47. An end 48 of the shaft 45 is attached to the guide 47, and the shaft is adapted to slide through the cylinder 44 so that as the end 48 of the shaft moves up and down the wire guide 47 also moves towards and away from the workpiece 12 as appropriate.

Figure 4:
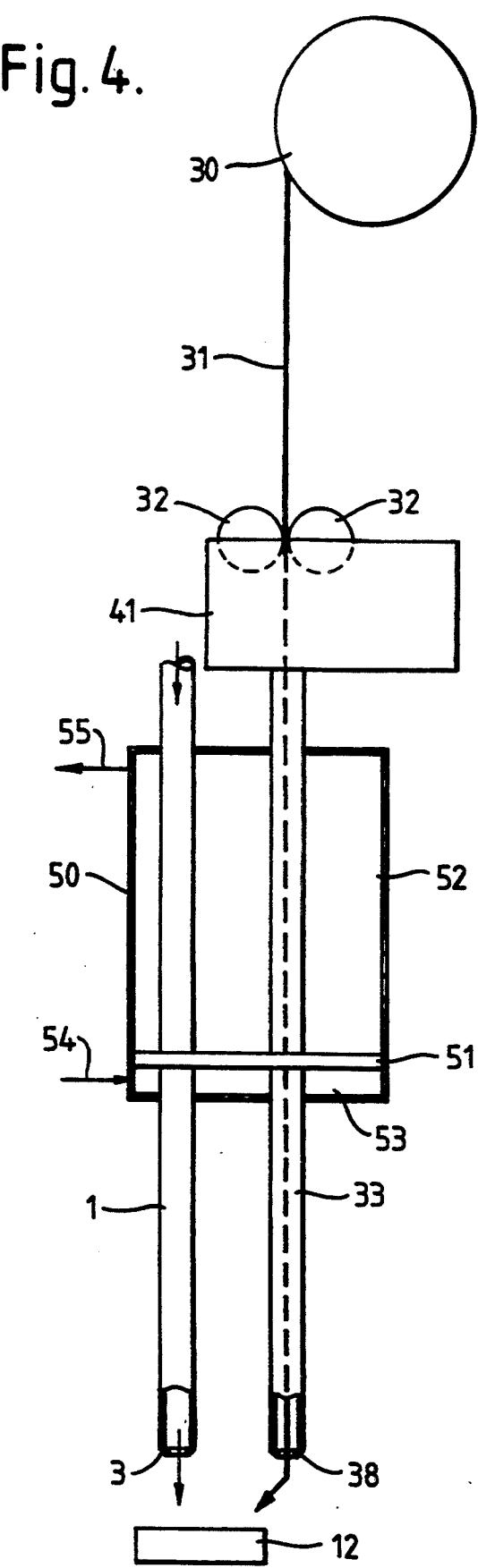
FIG. 4 is a schematic representation of an alternative embodiment of a combined flame source and solder wire dispenser.

FIG. 4 shows a combined flame source and solder wire dispenser, the flame source being substantially similar to that shown in FIGS. 1.0 and 1.1 and the dispenser being substantially similar to that shown in FIG. 3.0, such that like reference numerals are used for like parts.

The hollow tube 1 acts as a gas supply to the flame nozzle 3, while the hollow shaft 33 guides the solder wire 32 to the guide nozzle 38, the wire being dispensed from roll 30 by means of drive rollers 32. Both the tube 1 and the shaft 33 are adapted to slide through a cylinder 50. A piston 51 is fixedly attached to both the tube 1 and the shaft 33, and the piston is caused to move slidingly within the cylinder by means of fluid pressure. The piston divides the cylinder into two chambers 52 and 53 and, in the position shown in FIG. 4, entry of fluid into the chamber 53 in the direction of arrow 54, and exit of fluid from the chamber 52 in the direction of arrow 55, causes the piston to move upwardly in the cylinder. This moves the tube 1 and the shaft 33 upwardly simultaneously and thus moves the flame nozzle 3 and the solder wire guide nozzle 38 away from the workpiece 12. Reversing the direction of fluid flow causes the piston and its attached nozzles to move downwardly towards the workpiece.

The arrangement shown in FIG. 4 produces a particularly compact device. The guide nozzle 38 may be angled with respect to the shaft 33 to direct the wire towards the part of the workpiece which has been heated by the flame source. The solder wire 31 may be fed through the shaft 33 with an appropriate time delay, and the solder wire may also be retracted a short distance into the nozzle 38 after soldering the workpiece 12, to withdraw the wire to a cooler position further from the flame in the rest position. Rollers 32 would be driven accordingly. Alternatively, the solder shaft 33 with the angled nozzle 38 could be rotated through a few degrees (e.g. 10 degrees or more) in either direction around the axis of the shaft. This also moves the solder wire to a cooler position further from the flame in the rest position, to prevent the wire from being heated by minor flame radiation (or in the case of electrical resistance heating, by much higher heat radiation in all directions from nozzle 3) in the rest position.

The hollow tube sliding flame source provides a simple, precise, quick-response, low-cost and highly reliable soldering device which may be used in a variety of applications not limited to those discussed above.

I claim:

1. A solder dispenser comprising means defining a first chamber which is supported in use with respect to a work bed; a first rigid hollow tube for guiding solder wire passing therethrough towards the work bed, the first rigid hollow tube extending through the first chamber and being slidable with respect to the first chamber; and means for moving the first rigid hollow tube with respect to the first chamber to vary the position of one end of the tube with respect to the work bed, the solder dispenser additionally comprising at least one of a solenoid having a plunger and a linear electric motor which act on the hollow tube to slide the hollow tube through the chamber.

2. A solder dispenser comprising means defining a first chamber which is supported in use with respect to a work bed; a first rigid hollow tube for guiding solder wire passing therethrough towards the work bed, the first rigid hollow tube extending through the first chamber and being slidable with respect to the first chamber; means for moving the first rigid hollow tube with respect to the first cheer to vary the position of one end of the tube with respect to the work bed; and a second rigid hollow tube extending through the first chamber for delivering a source of heating energy to one end thereof, the second rigid hollow tube being slidable with respect to the chamber to move said one end of the tube relative to the work bed.

3. A solder dispenser according to claim 2, wherein the first hollow rigid tube is supported within the chamber by a piston, the piston being slidable within the chamber under pneumatic or hydraulic pressure.

4. A solder dispenser according to claim 2, in which the end of the first tube is angled with respect to the remainder of the tube.

5. A solder dispenser according to claim 2, in which solder wire is fed through the first hollow tube by means of drive rollers.

6. A solder dispenser as claimed in claim 2, in which the second rigid hollow tube extends parallel to the first rigid hollow tube and is attached to the first rigid hollow tube to be movable therewith.

7. A soldering device comprising:
  a solder dispenser comprising means defining a first chamber which is supported in use with respect to a work bed; a first rigid hollow tube for guiding solder wire passing therethrough towards the work bed, the first rigid hollow tube extending through the first chamber and being slidable with respect to the first chamber; and means for moving the first rigid hollow tube with respect to the first chamber to vary the position of one end of the tube with respect to the work bed,
  a heat delivery device comprising means defining a second chamber which is supported in use with respect to the work bed, a second rigid hollow tube for delivering a source of heating energy therethrough to one end thereof, the second rigid hollow tube extending through the second chamber and being slidable with respect to the second chamber, and means for moving the second rigid hollow tube with respect to the second chamber to vary the position of said one end of the second tube with respect to the work bed.

8. A soldering device as claimed in claim 7, in which the means for moving the respective tubes comprise first and second pistons supporting the tubes in the respective chambers, the pistons being movable under hydraulic or pneumatic pressure.

9. A soldering device as claimed in claim 7, in which the means for moving the respective tubes comprise at least one of a solenoid having a plunger and a linear electric motor acting on each tube to slide the tube through the chamber.

10. A solder device comprising:
  a first rigid hollow tube for guiding solder wire passing therethrough towards a work bed;
  means defining a chamber to be supported in use with respect to the work bed;
  a second rigid hollow tube for delivering a source of heating energy therethrough to one end thereof, the second rigid hollow tube extending through the chamber so as to be slidable with respect to the chamber to move said one end towards and away from the work bed; and
  means for moving the second rigid hollow tube with respect to the chamber;
  wherein the first rigid hollow tube is positioned on the outside of the chamber and is attached to the second rigid hollow tube so as to be movable therewith.

11. A soldering device as claimed in claim 10, further comprising drive rollers for feeding the solder wire through the first rigid hollow tube.

12. A soldering device as claimed in claim 10, wherein the means for moving the second rigid hollow tube comprises a piston supporting the second rigid hollow tube within the chamber, the piston being movable within the chamber under pneumatic or hydraulic pressure.

13. A soldering device as claimed in claim 10, wherein the tube guiding the solder wire is fixed at an angle with respect to the tube supplying the source of heating energy.

14. A soldering device as claimed in claim 10, wherein the means for moving the second rigid hollow tube comprise at least one of a solenoid having a plunger and a linear electric motor acting on the tube to slide the tube through the chamber.

15. A solder device comprising:
  a solder dispenser comprising means defining a first chamber which is supported in use with respect to a work bed, a shaft extending through the first chamber and being slidable with respect to the first chamber, means for moving the shaft with respect to the first chamber to vary the position of an end of the shaft with respect to the work bed, and a first rigid hollow tube attached to the end of the shaft for guiding solder wire passing therethrough towards the work bed; and
  a heat delivery device comprising means defining a second chamber which is supported in use with respect to the work bed, a second rigid hollow tube for delivering a source of heating energy therethrough to one end thereof, the second rigid hollow tube extending through the second chamber and being slidable with respect to the second chamber, and means for moving the second rigid hollow tube with respect to the second chamber to vary the position of the end of the second tube with respect to the work bed.

* * * * *